United States Patent Office

PTO - BOYERS, PA Duty Station

MISSING PAGE TEMPORARY NOTICE

PATENT # 4159X FOR ISSUE DATE 6-27-1825 HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

Drawing Pg.

Data Conversion Operation

Boyers, Pa

NO DRAWING AVAILABLE

4159X

The United States of America

To All to whom these letters patent shall come
Whereas John Moon a Citizen of the United States hath
alledged that he has invented a new and useful
improvement in his Machine for shelling corn
which improvement he states has not been known or used
before his application hath Affirmed that he does
verily believe that he is the true inventor or
discoverer of the said improvement hath paid
into the treasury of the United states the sum
of thirty Dollars delivered a receipt for the same and
Presented a petition to the secretary of state
Signifying a desire of obtaining an exclusive property
in the said improvement and praying that a
Patent may be granted for that purpose these
Are therefore to grant according to law to the
Said John Moon his heirs Administrators or
Assigns for the term of fourteen years from the
twenty seventh day of June one thousand eight
hundred and twenty five the full and exclusive
Right and liberty of Making constructing using and
Vending to others to be used the said improvement
a description whereof is given in the words of the
said John Moon himself in the schedule hereunto
Annexed and is made a part of these presents
In testimony whereof I have caused these
Letters Letters to be made patent and the seal of the
United states to be hereunto affixed
Given under my hand at the city of Washington
this twenty seventh day of June in the year of
our Lord one thousand eight hundred and twenty
five and of the independence of the United States
of America the forty ninth
J. Q. Adams By the president H. Clay Secretary of State City of Washington To Wit I do hereby certify that the foregoing letters patent
were delivered to me on the twenty seventh day
of June in the year of our Lord one thousand
eight hundred and twenty five to be examined
that I have examined the same and find them
conformable to law and I do hereby return the same
to the Secretary of State within fifteen days from the
date aforesaid to wit this twenty seventh day of
June in the year aforesaid Wm West Attorney General of the United States